United States Patent [19]

Leuthold et al.

[11] Patent Number: 5,156,867
[45] Date of Patent: Oct. 20, 1992

[54] METHOD AND APPARATUS FOR OPERATING A CONCHING DEVICE

[75] Inventors: Johannes Leuthold, Zuzwil; Werner Kuster, Niederuzwil, both of Switzerland

[73] Assignee: Bühler AG, Uzwil, Switzerland

[21] Appl. No.: 756,179

[22] Filed: Sep. 6, 1991

[30] Foreign Application Priority Data

Sep. 13, 1990 [DE] Fed. Rep. of Germany ....... 4029037

[51] Int. Cl.⁵ .......................... A23G 1/00; B23Q 15/00
[52] U.S. Cl. ...................................... 426/231; 99/348; 99/485; 99/486; 366/601; 426/519; 426/660
[58] Field of Search ........... 426/231, 660, 519; 99/485, 486, 348, 483; 366/601

[56] References Cited

U.S. PATENT DOCUMENTS 4,017,645 4/1977 Ziccarelli ..................... 426/660
4,679,498 7/1987 Chaveron et al. ................. 99/485

*Primary Examiner*—George Yeung
*Attorney, Agent, or Firm*—Martin A. Farber

[57] ABSTRACT

In a conching device (1) at least one rotor (2, or 3, respectively) is driven by an electric motor (9). The driving motor (9) is controlled by means of a motor control unit (8). To establish the amount of energy introduced into the conching device (1), at least one motor-operation parameter is detected and evaluated. To shorten the conching time of a conching process to the necessary extent, it is provided to establish the amount of energy introduced into the conching device at least during the viscous-plastic phase of the chocolate mass and to control the conching process in dependency upon the summation value of energy attained. Since the amount of energy introduced during the viscous-plastic phase determines the properties and the quality of the chocolate, a high reproducibility will be ensured.

14 Claims, 1 Drawing Sheet

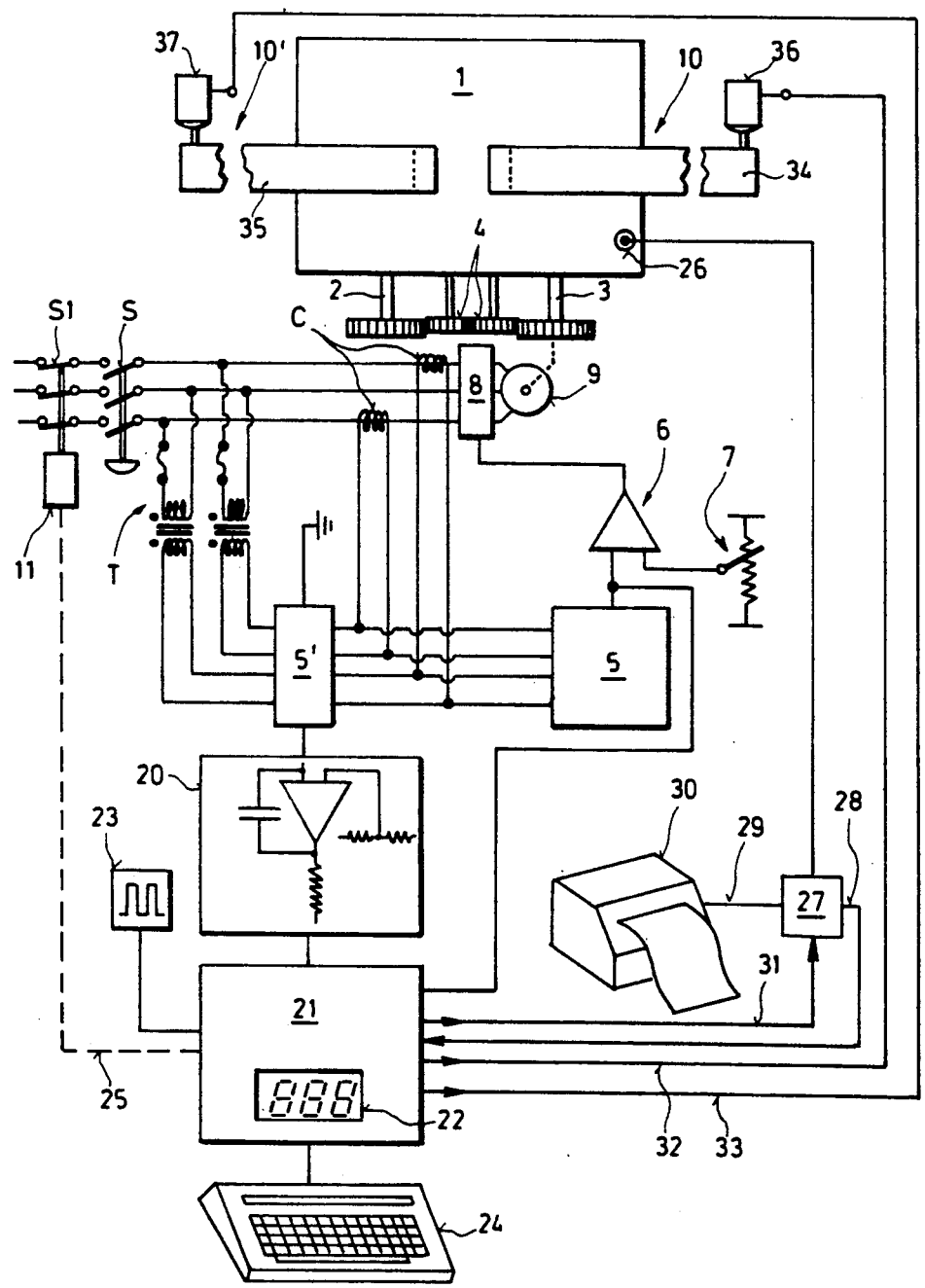

METHOD AND APPARATUS FOR OPERATING A CONCHING DEVICE

FIELD OF THE INVENTION

The invention relates to a method for operating a conching device for triturating and refining chocolate masses within a trough, in which at least one rotor rotates when driven by a motor, the rotor comprising a plurality of refining tools distributed over its circumference and arranged in axial distances to one another, with the driving motor being controlled by a motor control unit, and detecting and evaluating at least one motor-operation parameter for the establishment of the amount of energy introduced into the conching device, with the chocolate mass changing from a dry-pasty condition via a viscousplastic condition into a liquid condition. The invention is also concerned with an apparatus for carrying out the method, comprising a motor control unit connected to an electric driving motor, and a measuring unit for the detection of at least one motor-operation parameter, with the measuring unit being connected—in particular via a signal converter—to an integrating stage.

BACKGROUND OF THE INVENTION

Conching devices may be designed as dry conching devices or as liquid conching devices. It is preferred to use conching devices that can be operated both as dry conching devices and liquid conching devices. With such a conching device as it has become known from DE-A 36 26 732, refining tools with refining blades extending diagonally to the trough wall are provided, which refining tools serve as scrapers or wipers for the dry treatment when the direction of rotation is reversed. The conching devices can have only one rotor in a trough compartment assigned to it, or else a plurality of rotors in trough compartments respectively assigned to them. When a conching device is employed which, by changing the direction of rotation of the rotors, can be operated both as a dry conching device and as a liquid conching device, the chocolate mass will first assume a dry-pasty condition, whereupon it will turn into a viscous-plastic condition to finally change into a liquid condition. With such a conching of the chocolate mass by means of the mechanical action of the rotors, a heating and aeration will be accomplished. When using this arrangement, for example a volatilization of organic acids, such as acetic acid, and also a desired oxidation of flavorings will result. Moreover, a mixing effect and a rounding off of the particles will be achieved. However, such a conching process is extremely time-consuming. Thus, fine chocolate masses will have to be conched up to 48 hours. This is aggravated by the fact that chocolate masses of identical recipe, of the same comminution rate, and of the same temperature will often have completely different viscosities, which has a considerable influence upon the conching process.

For a shortening of the conching process, it has already been suggested, according to DE-A 39 34 047, to adjust the speed of the driving motor in dependency upon a preselectable motor current, so that the energy consumed during a conching process may be adjusted to the different states of aggregation of the chocolate mass.

It is an object of the present invention to provide a method for operating a conching device in which the period of time of a conching process is exactly adapted to the chocolate mass contained within the trough, as well as to provide an arrangement for carrying out the method.

SUMMARY OF THE INVENTION

The invention attains the desired object by detecting the amount of energy introduced into the conching device at least during the viscous-plastic phase of the chocolate mass, and by deriving, in dependency upon the summation value of energy attained, a signal for ending at least one period of the conching process and/or for the admixture of chocolate ingredients. An arrangement for carrying out the method comprises a motor control unit connected to the electric driving motor, and a measuring unit for the detection of at least one motor-operation parameter, with the measuring unit being connected—in particular via a signal converter—to an integrating stage the output of which is connected to a calculator that controls the driving motor via a control line.

It has become apparent that different chocolate properties and -qualities are practically determined exclusively by a different energy supply during the viscous-plastic phase of the chocolate mass. By derivation of the termination signal for the conching process from the summation value of energy of the energy introduced into the conching device during the viscous-plastic phase, a chocolate mass of identical properties and of an identical quality can be conched in a manner easy to repeat. When controlling the conching process according to the summation value of energy, it will be ensured that only that much energy will be introduced into the chocolate mass as will be convenient and necessary for the treatment of the chocolate mass. Conching times considered necessary up to now, therefore, can be shortened significantly. Special attention is drawn to the fact that by the step of ending the conching process in accordance with the teachings of the invention after attaining the summation value of energy, the viscosities of chocolate masses of a same recipe, which are different at the beginning of the process, will have no influence on the chocolate properties and -qualities achieved.

It is advantageous to end the conching process a predetermined period of time after occurrence of the termination signal. The liquid phase of the chocolate mass is thus determined exclusively by this predetermined period of time, thereby taking into account that an additional energy supply during the liquid phase of the chocolate mass has practically no effects.

In accordance with the invention, the total energy introduced during the dry-pasty phase, and in addition preferably during the liquid phase of the chocolate mass, may be summed up to form the summation value of energy. In this way, it is possible to control both the dry phase and the liquid phase according to the summation value of energy preselected for this phase.

To determine the energy introduced into the conching device precisely, it may be advantageous to use the heat energy introduced into the conching device by way of a heat-affording medium for the formation of the summation value of energy, too. Even though this energy portion will be very low in comparison with the mechanical energy introduced, a still greater accuracy will thereby be achieved in the formation of the summation value of energy and the subseqent control.

A particular improvement of the invention lies in that the addition of individual compounding ingredients to the chocolate mass will be controlled in dependency upon the magnitude of the summation value of energy that has been detected. It is preferred to conduct the control acccording to the magnitude of the momentary energy values detected. Since the momentary energy intake (intake of mechanical energy) is a measure for the state of aggregation of the chocolate mass, the addition of the individual compounding ingredients can take place at that very instant when the chocolate mass treated in the conching device has reached its optimum consistency for incorporating the compounding ingredients to be added.

BRIEF DESCRIPTION OF THE DRAWING

Further characteristics of the invention will become apparent from the following description with reference to the sole figure of the drawing, in which an embodiment of an apparatus for carrying out the method as provided by the invention is illustrated schematically.

DETAILED DESCRIPTION OF THE PREFERRED EMBODIMENTS

Within a conching device, rotors in the interior of the trough of the conching device 1 rotating in respective trough compartments are driven by means of two rotor shafts 2 and 3. The drive of rotor shafts 2 and 3 occurs by way of a common driving motor 9, which, in the embodiment, drives shaft 3, and, with the help of intermediate gear wheels 4, does so with repect to shaft 2. A separated driving motor for each shaft may also be convenient. In the same manner, it is of no importance for the invention how many rotors will be arranged within the trough 1 of the conching device; both conching devices with only one rotor, and conching devices with three and more rotors are known.

The driving motor 9 is a polyphase motor (three-phase motor), which can be switched on via a main switch S, thereby connecting it to the power supply network. In series with the main switch S lies a switch S1, which is closed when inoperative. The motor current flowing in the feeding lines is detected via coils c. Further, a voltage detector T may be arranged and connected through isolating transformers. To detect a motor-operation parameter, a current detector operating via the coils c or a voltage detector will suffice. Advantageously, however, the current detection via the coils c will be used, so that a motor-operation parameter relevant to the determination of the energy taken in will be detected.

The coils c of the current detector are connected to a signal converter 5 whose output is connected to the first input of a comparator 6. A set-point adjuster 7 is connected to the second input of comparator 6. The output signal of comparator 6 is fed to a motor control unit 8 that controls the current intake of driving motor 9 in dependency upon the difference between the actual value of the motor current (signal converter 5) and the desired nominal value of the motor current (set-point adjuster 7).

This current-regulation circuit is not necessarily required for carrying out the method provided by the invention, but it represents a convenient design.

The signals of the voltage detector T and the signals of the current detector of the coils c are supplied to a further signal converter 5′, which may be integrated into the signal converter 5 to form a simple unit. The output of a signal converter combined in such a fashion is then fed, on the one hand, to comparator 6, and, on the other hand, to the integrating stage 20.

The integrating stage 20 connected to the signal converter 5′ comprises—as represented schematically—a preferably integrating amplifier, which may be combined with a preamplifier and/or a final amplifier. The integrating stage 20 integrates the energy (P-UxI) versus time. Due to the limited sizing of the condensator provided for the integration, the summation value of energy attained of the integrating stage is read off several times during a conching process, preferably in equidistant periods of time. When using this arrangement, the respective outgoing output signal of the integrating stage 20 is led to a processor (calculating unit) 21 being preferably composed of a microprocessor with a display 22 connected to it. A, preferably integrated, clock generator 23 connected to the processor 21 initiates the periodic read-out of the integrating stage with each clock signal, with the individual values read off being summed up in the processor 21. After each reading, the integrating stage 20 is reset to zero.

The processor 21 is connected to a regulating unit 11 via a control line 25, which regulating unit 11 actuates switch S1. If a control signal is on control line 25, the regulating unit will open switch S1 and separate the driving motor 9 from the polyphase network. Now, the main switch S will also be opened by the operator. After the lapse of a predetermined period of time, which is controllable through clock generator 23, switch S1 will be closed again. The apparatus is now ready for a new conching process.

It may also be suitable to prestress main switch S in its on-position by means of a spring. In its off-position, main switch S is held in its position by a detent cam or the like, which can be displaced by a solenoid. The solenoid is connected to control line 25, and, in the case of an incoming signal, the solenoid shifts the detent cam to a closed position, so that main switch S springs back into an inoperative or open position by the action of the spring. The driving motor is thus separated from the network.

Further, main switch S and switch S1 may be in operative connection by means of an electromagnetic locking circuit. After temporary closing of main switch S, switch S1 would be closed by a locking relay, which can be deenergized by a control signal on control line 25.

The processor 21 is further connected to a keyboard 24 for the input of data. Moreover, a display 22 will be provided, which, in the embodiment represented, is composed of a seven-segment display. Preferably a screen is provided for the display 22.

At the beginning of the conching process, the recipe of the chocolate mass to be treated is input into the processor 21 via the keyboard 21. On the basis of the data input and a memory provided in the processor 21, the processor 21 then establishes the time required for the conching process, or the energy to be introduced, respectively. After the start of the conching process by switching on main switch S, the driving motor 9 is set going. The occurring motor-operation parameters are detected with the help of the current detection by way of coils c and via the voltage detector T and are then directed to integrating stage 20 via the signal converter 20. The occurring summation values of energy are summed up by the processor 21 until the summation value of energy read off from the memory is attained.

Now, a termination signal is generated, which initiates a control signal on control line 25 and opens switch S1 for terminating the conching process.

After the generation of the termination signal, it is advantageous to control the ensuing liquid phase of the conching process according to a predetermined time. This predetermined period of time is also read off from the memory of the processor on the basis of the data input. After the occurrence of the termination signal, a corresponding period of time is measured off via the clock generator 23 before a control signal is initiated on line 25.

Apart from being controlled by a time control, the liquid phase and, when required, also the dry phase, can also be controlled according to a predetermined summation value of energy. Which one of the operation manners for carrying out the conching process is to be chosen, can be input via the keyboard 24.

It is preferred to evaluate the summation value of energy of the energy supply for the determination of the period of time of the conching process during the viscous-plastic phase. This procedure is based on the recognition that the quality and the properties of the chocolate are essentially dependent upon the energy input during the viscous-plastic phase of the chocolate mass.

To achieve a greater accuracy in forming the summation value of energy, it may be advantageous to take into account the temperature of the heat-affording medium of the tempering unit of the conching device 1 when forming the energy summation value. The tempering unit of the conching device 1 is employed-in a manner known per se-first for heating up the cool chocolate mass, and thereupon for its cooling after the mass has been heated up by the mechanical energy introduced. For this purpose, the conching device 1 is provided with a double jacket in which flows a heat-affording medium, in particular water. On the double jacket, there is provided a temperature sensor 26 that is in contact with the heat-affording medium and emits a signal corresponding to the temperature of the chocolate mass. The output signal of the temperature sensor 26 is fed to a signal converter 27 that is connected to the processor 21 via the data line 28.

In a preferred embodiment of the apparatus provided by the invention, the signal converter 27 is connected to a printer 30 via a data line 29 in order to indicate the actual temperature value in writing. The processor 21 is advantageously connected to the printer 30 via a data-output line 31. This is accomplished conveniently via the signal converter 27, which may comprise a corresponding control circuit for the printer 30.

Both the recipe data input via the keyboard 24 and the corresponding control values read off from the memory of processor 21 can be printed out by way of printer 30. It is advantageous to print out the time behavior of the amount of energy introduced as well, and preferably also the temperature behavior so that a written documentation will be given ensuring a reproducibility, with the properties and quality of the chocolate remaining alike.

In a preferred embodiment of the apparatus provided by the invention, the conching device 1 is simultaneously used for the admixture of compounding ingredients into the chocolate mass in accordance with the recipe. In the embodiment shown, the admixture of the compounding ingredients takes place with the help of conveying belts 34 and 35, with each respective conveying belt 34 and 35 being driven by means of a separated driving motor 36, or 37, respectively, and with the conveying belts being part of a discharge system of a container (not shown), for example for cocoa butter, milk powder, or lecithin, respectively, or other additives. It is to be understood that these conveying belts represent only an example for a discharge system and may be replaced by any other equivalent means known per se for the dosed admixture of additives. Each driving motor is connected to processor 21 via a separated control line 32 and 33. If required, necessary control stages of a known fashion are arranged between the driving motors 36 and 37 and the processor 21 in order to switch the motors on or off.

Since the recipe of the chocolate mass to be treated has been input into the processor 21, the admixture of the compounding ingredients can be controlled by the processor without any difficulties. In this connection, it is advantageous to design the admixture reproducible according to the supply of a determined amount of energy. This is particularly advantageous for the reason that after the introduction of a determined amount of energy a determined viscosity of the chocolate mass will be given, which viscosity will ensure a satisfactory distribution of the compounding ingredients as well as the incorporation into the chocolate mass. Thus, after attaining a first summation value of energy, the motor can be put into operation via control line 32 for the introduction of a first compound or ingredient. After attaining a second summation value of energy, motor 37 is switched on via control line 33 for the admixture of a second compound or ingredient.

Instead of the feeding units 10 and 10' illustrated in the embodiment also a single feeding unit may be provided, with which several compounding ingredients are added one after the other. It is also convenient to arrange storage bins containing compounding ingredients above the conching device, in which arrangement the silo openings can be opened by means of the driving motors 36 and 37 and corresponding control units.

The admixture of the compounding ingredients takes place advantageously through the feeding units 10 and 10' in dependency upon the momentary energy intake of driving motor 9. For this purpose, the output of signal converter 5 is connected to processor 21, which compares the actual value coming from the signal converter 5 with a desired nominal value and controls the corresponding feeding unit 10 or 10', respectively, upon attaining the desired nominal value. The manner of adding of the compounding ingredients will not be dependent upon the control of the conching process according to a summation value of energy. Since the momentary energy intake of driving motor 9 constitutes an indirect measure for the liquidity of the chocolate mass, the admixture of the chocolate ingredients takes place in dependency upon the current intake of driving motor 9 measured by the current dectector c. Particular attention may be drawn to the fact that several functions during a conching process can be controlled by the current detector and its coils c. In the embodiment shown, the current-dependent control of driving motor 9, the control of the duration of the conching process by means of processor 21, and the admixture of compounding ingredients according to the momentary energy values of driving motor 9, are carried out by the current detector.

What is claimed is:

1. A process for operating a conching device for refining chocolate masses within a trough in which at least one rotor rotates when driven by a motor, the process comprising the steps of treating said masses by rotation of said rotor during a treatment phase in which said masses assume a viscous-plastic condition, treatment time comprising at least one period ending with at least one operation selected from the group consisting of adding at least one additive to said masses, and initiating stoppage of said motor;

detecting at least one parameter representative of the energy consumption of said motor at least during said treatment phase of viscous-plastic condition;

integrating said at least one parameter at least during said phase to get summation values of energy; and ending said at least one period after a first predetermined summation value has been attained.

2. Process as claimed in claim 1, wherein said step of ending comprises stopping said motor a predetermined time after said first predetermined summation value has been attained.

3. Process as claimed in claim 1, wherein said step of ending comprises stopping said motor after said first predetermined summation value has been exceeded by a second predetermined summation value.

4. Process as claimed in claim 1, wherein said steps of treating, detecting and integrating are also carried out during a treatment phase in which said masses are still in a dry-pasty condition before said viscous-plastic condition.

5. Process as claimed in claim 1, wherein said steps of treating, detecting and integrating are also carried out during a treatment phase in which said masses have already turned into a liquid condition after said viscous-plastic condition.

6. Process as claimed in claim 1, further comprising the step of introducing heat energy into said masses by leading up a heating medium to said trough, said step of integrating further including integrating also the amount of said heat energy.

7. Process as claimed in claim 1, further comprising the step of monitoring the momentary consumption of energy and adding at least one of said additives when a predetermined momentary value is attained.

8. A conching device for refining chocolate masses to let them assume a viscous-plastic condition, the apparatus comprising wall means defining at least one trough;

at least one rotor rotatably mounted within said trough and having a plurality of tools for treating said masses;

motor means for imparting rotating movement to said rotor;

motor control means for switching said motor;

energy detecting means for detecting the energy consumption of said motor;

integrating means connected to said energy detecting means for integrating the energy consumed by said motor at least during a viscous-plastic phase of said masses for deriving an integrated signal; and calculating means receiving said integrated signal from said integrating means for summing up the energy consumption at least during said viscous-plastic phase and controlling said motor control means.

9. A conching device as claimed in claim 8, further comprising signal converter means interconnected between said energy detecting means and said integrating means.

10. A conching device as claimed in claim 8, further comprising at least one temperature sensor being connected to said calculating means.

11. A conching device as claimed in claim 10, further comprising jacket means for receiving a heating medium for introducing heat energy into said chocolate masses.

12. A conching device as claimed in claim 11, wherein said temperature sensor is located within said heating medium.

13. A conching device as claimed in claim 8, further comprising feeding means for adding at least one additive to said masses; and a control line connecting said calculating means to said feeding means.

14. A conching device as claimed in claim 13, further comprising discharging means for said additives; and at least one driving element for driving said discharging means.

* * * * *